Sept. 13, 1966      L. J. HESLIN      3,271,872
DEVICE FOR CHECKING THREAD PITCH DIAMETER CONCENTRICITY
Filed Sept. 17, 1963
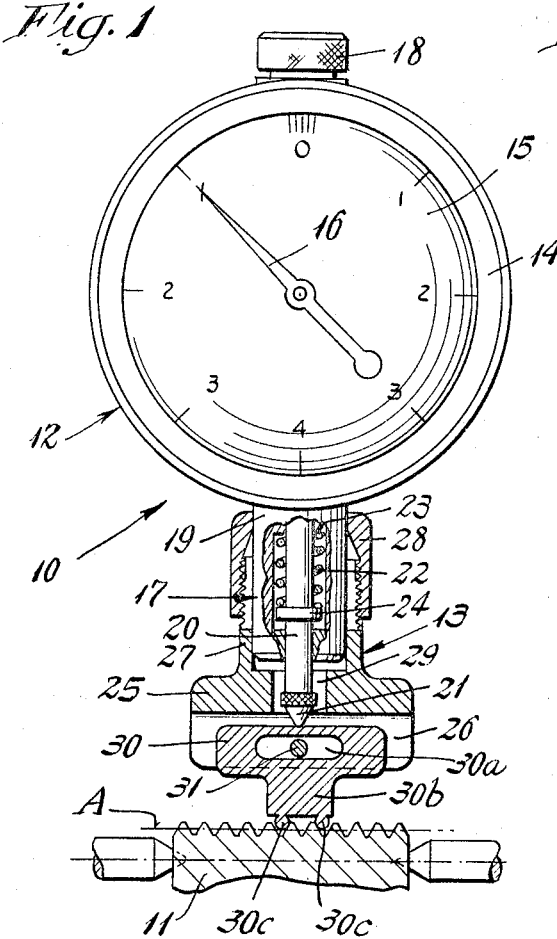
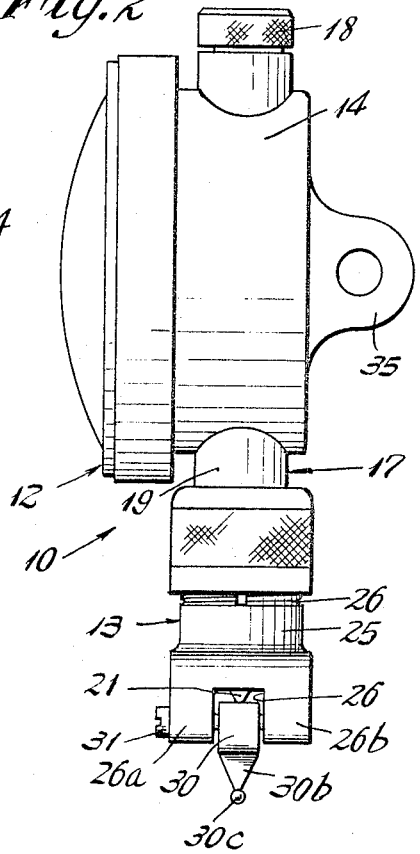
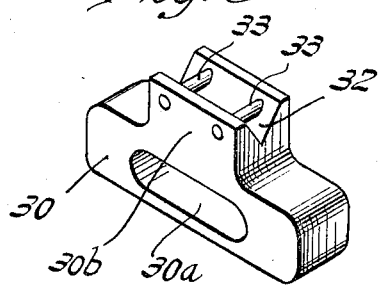
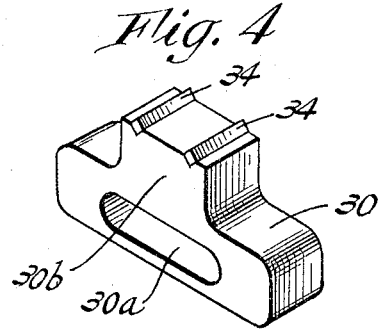
INVENTOR.
Lawrence J. Heslin
BY
Johnson and Kline
ATTORNEYS

United States Patent Office 3,271,872
Patented Sept. 13, 1966

3,271,872
DEVICE FOR CHECKING THREAD PITCH
DIAMETER CONCENTRICITY
Lawrence J. Heslin, 28 Sunrise Road, Danbury, Conn.
Filed Sept. 17, 1963, Ser. No. 309,570
9 Claims. (Cl. 33—199)

This invention relates to a device for indicating inaccuracies in the surface of a workpiece. More specifically, it pertains to a device for checking thread pitch diameter concentricity of a rotating workpiece.

It is an object of the invention to provide a device readily engageable with a rotating workpiece for indicating deviations in concentricity of the thread pitch diameter relative to the axis of the rotating workpiece.

It is also an object of the invention to provide a device for checking thread pitch diameter concentricity of a rotating workpiece, wherein deviation in concentricity is indicated by a dial indicator.

Another object of the invention is to provide a device for checking thread pitch diameter concentricity of a rotating workpiece including a dial indicator for direct reading of concentricity deviation and actuating means for the dial indicator which are engageable with the workpiece and movable along the thread thereof as the piece is rotated.

Still another object of the invention is to provide a device for checking deviation in the pitch diameter concentricity of the thread of a rotating workpiece which includes a plunger operated dial indicator and actuating means therefor responsive to deviations in the thread pitch diameter, such actuating means including means laterally floatably engageable with the plunger and engageable with the thread pitch diameter at spaced intervals along the workpiece as the latter rotates for moving the plunger to operate the dial indicator when the pitch diameter concentricity deviates from a predetermined norm.

Yet another object of the invention is to provide means for actuating a conventional plunger operated dial indicator for checking the deviation in the concentricity of the thread pitch diameter of a rotating workpiece which includes means engageable with the plunger for moving the same, such means, however, being laterally floatable relative to the plunger to facilitate movement along the thread as the workpiece rotates.

It is further an object of the invention to provide a device for checking thread pitch diameter concentricity of a rotating workpiece, wherein the means for engaging the workpiece and actuating a dial indicator in response to concentricity deviation is readily replaceable to facilitate checking workpieces having different types of threads.

It is still further an object of the invention to provide a device for checking thread pitch diameter concentricity which is readily assembled and used by unskilled labor and is of such rugged character it will function over long periods of time with freedom from all difficulties.

Other objects and advantages of the invention will be apparent from the specification and claims when considered in connection with the attached sheet of drawings, illustrating one form of the invention, wherein like characters represent like parts and in which:

FIGURE 1 is a front elevational view, partially broken away and in section, of a device for checking thread pitch diameter concentricity, according to the invention;

FIG. 2 is a side elevational view of the device of FIG. 1;

FIG. 3 is a perspective view of a modified form of pitch block; and

FIG. 4 is a perspective view of another form of pitch block.

Referring now to the drawings for a more detailed description of the invention, in FIGS. 1 and 2 a device 10 for checking the concentricity of the thread pitch diameter of a rotating workpiece 11 relative to the axis of the workpiece is shown, according to the invention.

As illustrated, the device 10 includes a conventional dial indicator 12 and a thread contacting actuating means 13 therefor in the form of an attachment to the indicator. The indicator, which may also form an integral part of the device 10 rather than a separate unit in combination with the actuator attachment, includes, as is well known in the art, a casing 14 housing a dial 15 bearing calibrated indicia, a pointer 16 rotatably mounted to traverse the dial and plunger means 17 for operating the pointer in a predetermined manner. The drive connection between the plunger means 17 and the pointer 16 is not shown, since it is conventional and well known to the art, but, as is common, is housed within casing 14. The indicator also includes a pointer adjustment means 18, the construction of which is conventional, for adjusting the pointer 16 to zero position in relation to the operable position of the plunger means 17.

The plunger means 17, which may take many well known forms, is here illustrated as including a plunger housing 19 connected to casing 14 and depending therefrom and a plunger 20 reciprocably mounted in the housing and connected to the pointer through the aforesaid well known drive connection. The plunger 20, which is formed with a substantially conical tip 21 extending outwardly of the housing in a direction away from the casing 14, is resiliently biased in the direction of the tip of a coil spring 22 bearing against a shoulder 23 in the housing and a flange 24 on the plunger.

As normally used to indicate deviations in the surface of a workpiece or the like, the dial indicator 12 is positioned with the plunger tip 21 in engagement with the surface to be checked so that the plunger is moved inwardly of the plunger housing, though not to its full extent, against the coil spring 22. Thereafter, the pointer 16 is adjusted by adjustment means 18 to zero position so that subsequent relative movement of the plunger tip and surface being checked cause the pointer, through the operation of the plunger, to move out of zero position to indicate irregularities in the surface of the workpiece; depressions in the surface enable the coil spring to project the plunger outwardly of the housing, thereby moving the pointer in one direction while elevation of the surface forces the plunger further into the housing, to move the pointer in the opposite direction.

The present invention adapts the concepts of the conventional dial indicator to checking the thread pitch diameter concentricity of a rotating workpiece by providing actuating means for the plunger, between the workpiece and the plunger tip, which may engage with and travel along the thread of the rotating workpiece without binding the plunger or otherwise interfering with its operation.

As illustrated, the plunger actuating means 13 includes a pitch block housing 25, rigidly connected to the plunger housing 19 of the dial indicator, having an elongate channel 26 extending substantially normal to the axis of the plunger 20. While the pitch block housing may be connected to the plunger housing by any means known to the art, in the illustrated form of the invention it is provided with an externally threaded split sleeve 27, in the form of a collet, embracing the plunger housing and locked thereon by a nut 28. The sleeve 27, which is substantially concentric with the plunger 20 opens into the channel 26 of the pitch block housing through a bore 29, whereby plunger tip 21 may extend into the channel.

Within the channel 26 a pitch block 30 is floatably carried by a pin 31 removably connected between the walls 26a and 26b of the channel. The pitch block is provided with an elongate slot 30a through which the pin extends, the slot being of substantially greater width than the pin to enable the pitch block to freely move in either direction of movement of the plunger and being of such a length as to enable the pitch block to freely float or travel laterally relative to the plunger in a plane parallel to the axis of rotation of the workpiece being checked while it is in engagement with the plunger and the workpiece, as will be hereinafter explained.

Forming an integral part of the pitch block 30 and depending therefrom at the side thereof directed away from plunger 20 is a workpiece engaging portion 30b in the form of a stud, which carries spaced means 30c for engaging the thread pitch diameter at spaced intervals along the workpiece. In the form of the invention shown in FIGS. 1 and 2, the pitch diameter engaging means 30c comprises beads formed integral with the stud 30b. It will be understood that the spacing of the beads or thread engaging means 30c, as well as their size, will be dependent upon the size and shape of the thread being checked and accordingly the pitch block is designed to be readily removed from the pitch block housing, by removal of the pin 31 for replacement, repair or substitution of pitch blocks.

In FIGS. 3 and 4 modified forms of pitch block 30 are shown having different forms of thread pitch diameter engaging means. In FIG. 3 the stud 30b is formed with a V-shaped channel 32, which extends parallel to the channel 26 of the pitch block housing, and carries spaced wires 33 extending between the walls of the channel for engaging the thread of the workpiece in substantially the same manner as did the beads 30c, discussed in connection with FIGS. 1 and 2. In FIG. 4 the stud 30b has secured therein, by any means known to the art, spaced bars 34, rectangular in cross-section, and positioned to present a sharp edge for engagement with the thread of the workpiece.

According to the invention, the device 10 is operated for checking thread pitch diameter concentricity by rigidly securing it relative to the workpiece so that the thread of the workpiece is engaged at the pitch diameter indicated by dash line A in FIG. 1, at spaced intervals along the workpiece by the thread engaging means of the pitch block 30. This may be accomplished by clamps or the like, being connected to the device through the bracket 35 extending from the rear of indicator casing 14, or in any other manner found expedient. The device should be so positioned relative to the workpiece that the pitch block engages the plunger tip 21 forcing the plunger inwardly of the plunger housing against its spring, though not to the full extent of such movement. The indicator is then zeroed by means of the adjustment means 18, as was described with respect to the normal operation of dial indicators, and thereafter the workpiece is rotated. As the workpiece rotates the pitch block travels along the thread, moving toward or away from the plunger in response to deviations in thread pitch concentricity, for moving the plunger and thereby operating the dial indicator. In this manner, thread pitch diameter concentricity, which is the relationship between the pitch diameter and the axis of the rotating workpiece, may be checked.

Thus, among others, the several objects and advantages of the invention as aforenoted are achieved. Obviously numerous changes in the structure may be resorted to without departing from the spirit of the invention as defined by the claims.

I claim:

1. An actuating attachment for a dial indicator having movable plunger operating means to adapt the indicator for checking thread pitch diameter concentricity of an independently supported and rotated workpiece; said attachment comprising means for rigidly connecting said attachment to said indicator operably adjacent said plunger operating means and means freely universally floatable relative to said plunger operating means in a plane parallel to the axis of rotation of the workpiece, said floatable means being in operable engagement with said plunger operating means and having means engageable with the thread pitch diameter at one side of the workpiece to be checked and at spaced intervals therealong for moving said plunger operating member in response to deviation in the thread pitch diameter concentricity as the workpiece is rotated.

2. An actuating attachment for a dial indicator including a casing and a plunger operating member reciprocably carried in a plunger housing projecting from the casing; the attachment adapting the indicator for checking the thread pitch diameter concentricity of an independently supported and rotated workpiece and comprising a pitch block housing removably rigidly connected to the plunger housing, and a pitch block freely floatably carried by the pitch block housing and having thread engaging means for engaging the thread pitch diameter at spaced intervals along one side of the workpiece being checked, said pitch block being universally floatable relative to said plunger operating member in a plane parallel to the axis of rotation of said workpiece to facilitate its travel along the thread as the workpiece is rotated and being in engagement with the plunger operating member for reciprocating the same in response to deviation in the concentricity of the thread pitch diameter of the workpiece.

3. A device for checking thread pitch diameter concentricity relative to a fixed axis of an independently supported and rotated workpiece comprising in combination a deviation indicator having movable operating means therefor; and actuating means cooperating with said indicator for actuating said operating means in response to deviation in the thread pitch diameter concentricity of the workpiece being checked, said actuating means including means freely universally floatably mounted relative to said operating means for predeterminately limited movement in a plane parallel to the axis of rotation of said workpiece, said laterally floatable means being engageable with the thread pitch diameter of the workpiece at spaced intervals along one side of the workpiece to be moved thereby as said workpiece is rotated and being in engagement with said operating means for moving the same, whereby as said workpiece is rotated and said floatable means travels longitudinally thereof along the thread said operating means is moved in response to deviation in the thread pitch diameter concentricity for operating the deviation indicator.

4. A device for checking thread pitch diameter concentricity relative to a fixed axis of an independently supported and rotated workpiece comprising in combination a deviation indicator having operating means therefor, said operating means including a plunger housing having a spring loaded plunger member longitudinally reciprocably mounted therein; and actuating means rigidly connected to said housing for reciprocating said plunger member in response to deviation in the thread pitch diameter concentricity of the workpiece being checked, said actuating means including means freely universally floatably mounted relative to said plunger member for predeterminately limited movement in a plane parallel to the axis of rotation of said workpiece, said laterally floatable means being engageable with the thread pitch diameter of the workpiece at spaced intervals along one side of the workpiece to be moved thereby as said workpiece is rotated and being in engagement with said plunger member for reciprocating the same, whereby as said workpiece is rotated and said floatable means travels longitudinally thereof along the thread said plunger member is reciprocated in response to deviation in the thread pitch diameter concentricity for operating the deviation indicator.

5. A device for checking thread pitch diameter concentricity relative to a fixed axis of an independently supported and rotated workpiece comprising in combination a deviation indicator having operating means therefor, said operating means including a plunger housing having a longitudinally movable plunger member mounted therein and resiliently biased to project outwardly of the housing; and actuating means for said operating means of said deviation indicator, said actuating means including a pitch block housing rigidly connected to said plunger housing, and a pitch block mounted by said pitch block housing and having a lost motion connection therewith, said pitch block being floatably mounted relative to said plunger member for limited universal movement in a plane parallel to the axis of rotation of the workpiece and in engagement with said plunger member and movable in either direction of movement of said plunger member, said pitch block being provided with means for engaging the thread pitch diameter of the workpiece at spaced intervals along one side of the workpiece, whereby, as the workpiece is rotated, the pitch block travels longitudinally thereof along the thread and moves in either direction of movement of the plunger member in response to deviation in thread pitch concentricity for moving the plunger member and operating the deviation indicator.

6. A device for checking thread pitch diameter concentricity relative to a fixed axis of an independently supported and rotated workpiece comprising in combination a deviation indicator having operating means therefor, said operating means including a plunger housing having a longitudinally movable plunger member mounted therein and resiliently biased to project outwardly of the housing; and actuating means for said operating means of said deviation indicator, said actuating means including a pitch block housing rigidly connected to said plunger housing, and a pitch block having a slot therein normal to said plunger member for loosely receiving a pin rigidly carried by said pitch block housing for mounting said pitch block thereon, said pitch block being floatably mounted relative to said plunger member for limited universal movement in a plane parallel to the axis of rotation of the workpiece and in engagement with said plunger member and movable in either direction of movement of said plunger member, said pitch block being provided with means for engaging the thread pitch diameter of the workpiece at spaced intervals along one side of the workpiece, whereby, as the workpiece is rotated, the pitch block travels longitudinally thereof along the thread and moves in either direction of movement of the plunger member in response to deviation in thread pitch concentricity for moving the plunger member and operating the deviation indicator.

7. A device for checking thread pitch diameter concentricity relative to a fixed axis of an independently supported and rotated workpiece comprising in combination a deviation indicator having operating means therefor, said operating means including a plunger housing having a longitudinally movable plunger member mounted therein and resiliently biased to project outwardly of the housing, said indicator including adjustment means for zeroing the same relative to the position of the plunger member; and actuating means for said operating means of said deviation indicator, said actuating means including a pitch block housing rigidly connected to said plunger housing, and a pitch block removably mounted by said pitch block housing and having a lost motion connection therewith, said pitch block being floatably mounted relative to said plunger member for limited universal movement in a plane parallel to the axis of rotation of the workpiece and in engagement with said plunger member and movable in either direction of movement of said plunger member, said pitch block being provided with means for engaging the thread pitch diameter of the workpiece at spaced intervals along one side of the workpiece, whereby, as the workpiece is rotated, the pitch block travels longitudinally thereof along the thread and moves in either direction of movement of the plunger member in response to deviation in thread pitch concentricity for moving the plunger member and operating the deviation indicator.

8. A device as defined in claim 6, wherein said pitch block includes predeterminately spaced means at the side thereof directed away from said plunger member for engaging the thread pitch diameter at spaced intervals along the workpiece and constituting the sole contact with the latter.

9. A device as defined in claim 7, in which said pitch block includes an elongate slot therein normal to said plunger member and wherein said pitch block is mounted by said pitch block housing by a pin rigidly carried by said pitch block housing and loosely received in said slot, said pin being removable from said pitch block housing so that said pitch block may be removed for replacement or repair.

References Cited by the Examiner

UNITED STATES PATENTS 3,009,253   11/1961   Swanson _____ 33—199

LEONARD FORMAN, *Primary Examiner.*